US009856774B2

(12) United States Patent
Di Perna et al.

(10) Patent No.: US 9,856,774 B2
(45) Date of Patent: Jan. 2, 2018

(54) ENGINE EXHAUST SYSTEM

(71) Applicant: GM GLOBAL TECHNOLOGY OPERATIONS LLC, Detroit, MI (US)

(72) Inventors: Luciano Nunziato Di Perna, Troy, MI (US); Raffaello Ardanese, Bloomfield Hills, MI (US); Michael J. Paratore, Jr., Howell, MI (US); Rahul Mital, Rochester Hills, MI (US); Jianwen Li, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/144,871

(22) Filed: May 3, 2016

(65) Prior Publication Data

US 2017/0321590 A1   Nov. 9, 2017

(51) Int. Cl.
| | |
|---|---|
| *F01N 3/00* | (2006.01) |
| *F01N 3/10* | (2006.01) |
| *F01N 3/02* | (2006.01) |
| *F01N 1/00* | (2006.01) |
| *F01N 13/00* | (2010.01) |

(Continued)

(52) U.S. Cl.
CPC ..... *F01N 13/0093* (2014.06); *B01D 53/9431* (2013.01); *B01D 53/9477* (2013.01); *F01N 3/027* (2013.01); *F01N 3/035* (2013.01); *F01N 3/103* (2013.01); *F01N 3/2066* (2013.01); *F01N 3/2892* (2013.01); *B01D 2255/904* (2013.01); *F01N 2330/02* (2013.01);

(Continued)

(58) Field of Classification Search
CPC ............. F01N 2610/02; F01N 2610/03; F01N 3/2026; F01N 3/2013; F01N 3/2066; F01N 3/208; F01N 3/206; F01N 3/0821; F01N 3/035; F01N 1/086; F01N 1/088; F01N 3/027; F01N 3/2892; F01N 3/103; F01N 13/0093; F01N 2610/1453; F01N 2330/02; B01D 53/9431; B01D 53/9477
See application file for complete search history.

(56) References Cited

U.S. PATENT DOCUMENTS

| | | | |
|---|---|---|---|
| 8,141,347 B2* | 3/2012 | Kubinski | B01D 53/9431 60/274 |
| 8,783,022 B2* | 7/2014 | Drasner, III | F01N 3/0231 60/276 |

(Continued)

*Primary Examiner* — Phutthiwat Wongwian
*Assistant Examiner* — Diem Tran
(74) *Attorney, Agent, or Firm* — Quinn IP Law

(57) ABSTRACT

An engine exhaust system includes an exhaust pipe assembly having an engine exhaust system inlet configured to receive engine exhaust and an engine exhaust system outlet. The system includes a first selective catalytic reduction (SCR) catalyst device positioned downstream in exhaust flow from the engine exhaust system inlet. The first SCR catalyst device includes a substrate with a metallic catalyst coated on the substrate. An electric heater is configured to heat the metallic catalyst. A second SCR catalyst device is positioned downstream in engine exhaust flow from the first SCR catalyst device and upstream of the engine exhaust system outlet. The first SCR catalyst device and the exhaust pipe assembly define an empty chamber between the substrate and the second SCR catalyst device. Engine exhaust flows directly from the substrate to the second SCR catalyst device through the empty chamber.

17 Claims, 3 Drawing Sheets

(51) Int. Cl.
    *F01N 3/20*      (2006.01)
    *F01N 3/027*     (2006.01)
    *F01N 3/035*     (2006.01)
    *F01N 3/28*      (2006.01)
    *B01D 53/94*     (2006.01)

(52) U.S. Cl.
    CPC ...... *F01N 2370/02* (2013.01); *F01N 2610/02* (2013.01); *F01N 2610/1453* (2013.01)

(56) References Cited

U.S. PATENT DOCUMENTS

| | | | |
|---|---|---|---|
| 8,813,478 B2 * | 8/2014 | Gonze | F01N 3/2013 |
| | | | 60/282 |
| 9,528,413 B2 * | 12/2016 | Katare | F01N 3/10 |
| 9,567,888 B2 * | 2/2017 | Gupta | F01N 3/208 |
| 2003/0077212 A1 * | 4/2003 | Hammer | B01D 53/9431 |
| | | | 423/239.1 |
| 2014/0363358 A1 * | 12/2014 | Udd | F01N 3/106 |
| | | | 423/212 |

\* cited by examiner

US 9,856,774 B2

ENGINE EXHAUST SYSTEM

TECHNICAL FIELD

The present teachings generally include an engine exhaust system.

BACKGROUND

Vehicle exhaust systems often include exhaust aftertreatment devices that filter or otherwise treat the exhaust prior to releasing the exhaust into the environment. For example, a diesel oxidation catalyst (DOC) is a device that utilizes a chemical process in order to break down gases from a diesel engine in the exhaust flow. DOCs oxidize carbon monoxide, hydrocarbons, nitric oxide (NO), and diesel particulate matter. Additionally, DOCs may reduce nitrogen oxides (NOx) to a certain extent, although the majority of NOx reduction is achieved by a selective catalytic reduction (SCR) device that is typically placed downstream of the DOC in the exhaust flow. The SCR device converts NOx into nitrogen and water. The SCR device may be coated in a precious metal catalyst designed to trigger a chemical reaction to reduce gaseous emissions.

Exhaust from a diesel engine exhibits relatively low temperatures for a period of time following engine startup. These temperatures are typically below a minimum temperature required for an SCR device to operate with a desired efficiency in reducing NOx.

SUMMARY

An engine exhaust system includes an exhaust pipe assembly having an engine exhaust system inlet configured to receive engine exhaust and an engine exhaust system outlet. The system includes a first selective catalytic reduction (SCR) catalyst device positioned downstream in exhaust flow from the engine exhaust system inlet. The first SCR catalyst device includes a substrate with a metallic catalyst coated on the substrate. An electric heater is configured to heat the metallic catalyst. A second SCR catalyst device is positioned downstream in engine exhaust flow from the first SCR catalyst device and upstream of the engine exhaust system outlet. The first SCR catalyst device and the exhaust pipe assembly define an empty chamber between the substrate and the second SCR catalyst device. Engine exhaust flows directly from the substrate to the second SCR catalyst device through the empty chamber.

In an embodiment, an exhaust mixer is positioned in the exhaust pipe segment. The exhaust mixer is the only exhaust mixer in the engine exhaust system between the engine exhaust system inlet and the engine exhaust system outlet.

By utilizing an electrically-assisted first SCR catalyst device with a metallic catalyst heated by the electric heater, DEF injection can begin at a lower temperature of the exhaust gas, several seconds earlier than otherwise following a cold start of the engine. Additionally, by providing the empty chamber between the first SCR catalyst device and the second SCR catalyst device, only one mixer is needed, and a shortened exhaust system with relatively low back pressure can achieve a high NOx conversion efficiency. This may improve fuel economy, while minimizing DEF use. The first SCR catalyst device and the second SCR catalyst device also warms up more quickly via the exhaust gas due to the relatively short length from the DOC to the first SCR catalyst. The exhaust system is relatively low cost and has a low thermal mass as well in comparison to other exhaust systems that can achieve a similar level of NOx conversion efficiency.

The above features and advantages and other features and advantages of the present teachings are readily apparent from the following detailed description of the best modes for carrying out the present teachings when taken in connection with the accompanying drawings.

DETAILED DESCRIPTION

Figure 1:
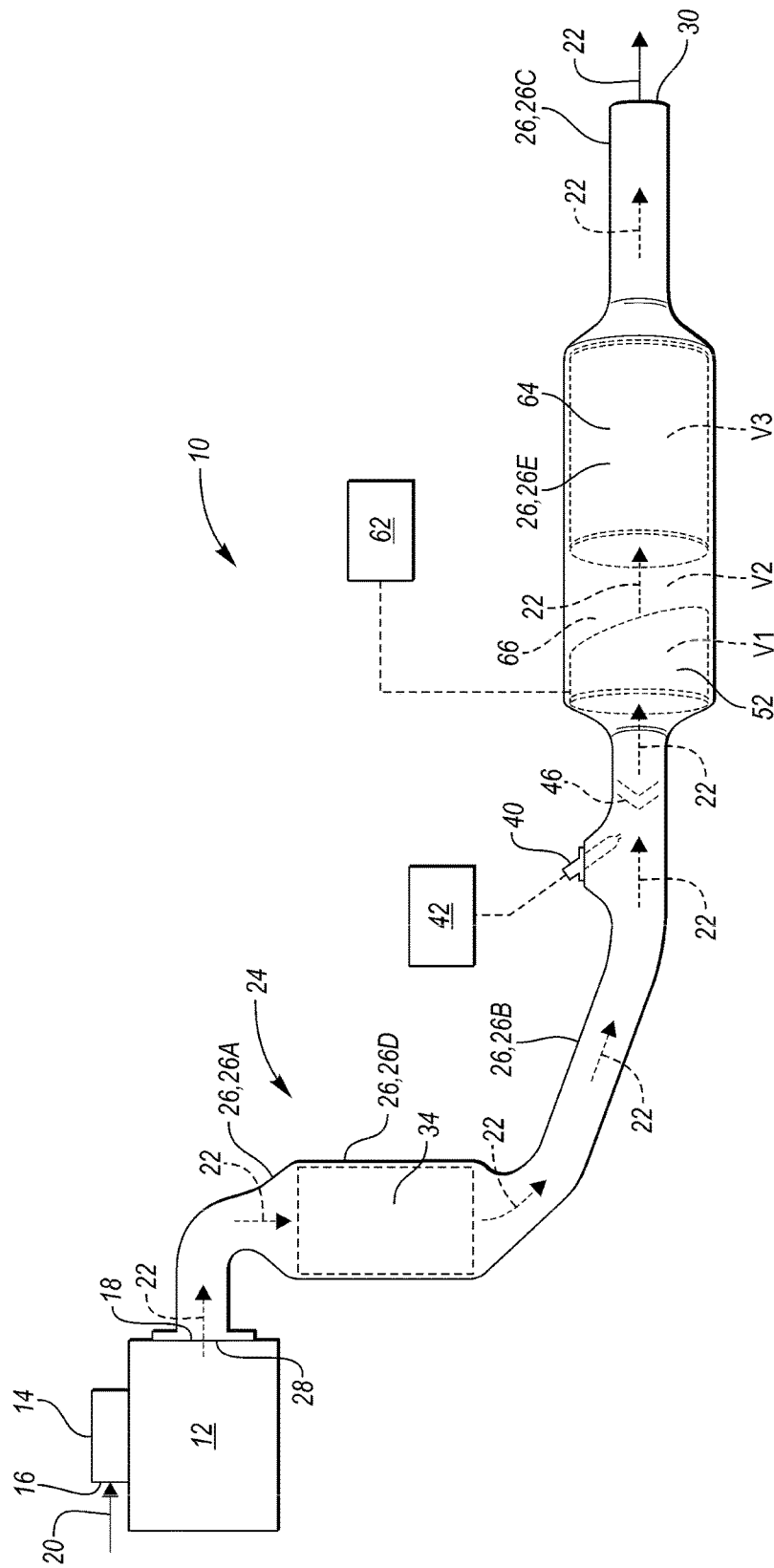
FIG. 1 is a schematic illustration in side view of a portion of a vehicle including an engine and an engine exhaust system.

Referring to the drawings, wherein like reference numbers refer to like components throughout the several views, FIG. 1 shows a portion of a vehicle 10 including a diesel engine 12. The diesel engine 12 has a manifold 14 with an air inlet 16, and has an engine exhaust outlet 18. Fresh air 20 received through the air inlet 16 is combusted in the engine and combustion gases (i.e., engine exhaust 22) flows through the engine exhaust outlet 18 into an engine exhaust system 24 operatively connected to the engine 12. More specifically, the engine exhaust system 24 includes an exhaust pipe assembly 26 that has an engine exhaust system inlet 28 secured to the engine exhaust outlet 18. The engine exhaust system inlet 28 is configured to receive the engine exhaust 22 from the engine 12 through the engine exhaust outlet 18.

The exhaust pipe assembly 26 includes several exhaust pipe segments 26A, 26B, 26C and component housings 26D, 26E that direct exhaust flow from the exhaust system inlet 28 to the exhaust system outlet 30. For example, the exhaust pipe segments 26A, 26B, 26C and the component housings 26D, 26E are generally cylindrical stainless steel, single wall pipes interconnected at flanges or otherwise.

The exhaust system 24 includes a diesel oxidation catalyst (DOC) 34 that is disposed in the engine exhaust system 24 downstream in the flow of engine exhaust 22 from the engine exhaust system inlet 28. The DOC 34 is a flow-through device that includes the component housing 26D as a canister that contains a substrate 36. The substrate 36 may have a honeycomb structure. The substrate 36 has a large surface area that is coated with an active catalyst material. For example, the active catalyst material may include platinum group metals. The DOC 34 treats the exhaust 22 to reduce nitric oxide (NO), carbon monoxide (CO), and/or hydrocarbons (HC) in the exhaust 22. The DOC 34 converts a percentage of the nitrogen oxides (NOx) in the exhaust 22 into nitrogen ($N_2$) and carbon dioxide ($CO_2$) or water ($H_2O$), oxidizes a percentage of the carbon monoxide (CO) to carbon dioxide ($CO_2$), oxidizes a percentage of the unburnt hydrocarbons (HC) to carbon dioxide ($CO_2$) and water ($H_2O$), and oxidizes nitric oxide (NO) into nitrogen dioxide ($NO_2$).

The DOC 34 is upstream in the flow of engine exhaust 22 of a diesel exhaust fluid (DEF) injector 40 that is disposed in the exhaust pipe segment 26B. The DEF injector 40 receives diesel exhaust fluid (DEF) 44 from a fluid source 42, and injects the DEF 44 directly into the flow of exhaust 22. The DEF 44 may be but is not limited to a mixture of urea and water. When heated by the engine exhaust 22, the aqueous urea vaporizes and decomposes to form ammonia ($NH_3$) and carbon dioxide ($CO_2$).

The DEF injector 40 injects the DEF 44 immediately upstream of an exhaust mixer 46 in the flow of engine exhaust 22. The exhaust mixer 46 is positioned in the exhaust pipe segment 26B. The exhaust mixer 46 is the only exhaust mixer disposed in the engine exhaust system 24 between the engine exhaust system inlet 28 and the engine exhaust system outlet 30. Stated differently, although mixing may occur by diffusion simply by exhaust flow through an empty length of an exhaust pipe segment, the mixer 46 is the only structural mixer positioned within the exhaust pipe assembly 26 that functions to actively mix the exhaust flow. The mixer 46 mixes the injected DEF 44 with the exhaust flow 22. The mixer 46 has structure within the pipe segment 26B, that may include lobes or vanes, that break up droplets of the DEF 44, increasing its entrainment in the flow of exhaust 22. When heated by the exhaust gas in the exhaust 22, the DEF 44 forms ammonia.

Figure 5:
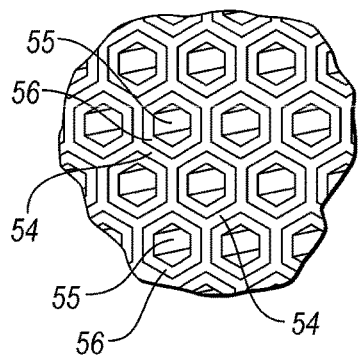
FIG. 5 is a schematic illustration in fragmentary view of the inlet face of FIG. 3.

The exhaust pipe segment 26B is operatively connected to an inlet 50 of a first selective catalytic reduction (SCR) catalyst device 52. The exhaust pipe segment 26B, as well as the DEF injector 40 and the mixer 46, are upstream in the flow of exhaust 22 from the first SCR catalyst device 52. The first SCR catalyst device 52 is positioned downstream in flow of exhaust 22 from the engine exhaust system inlet 28, the DOC 34, the DEF injector 40 and the mixer 46. The distance from the single mixer 46 to the first SCR catalyst device 52 is relatively short, as a second mixer need not be placed in the exhaust pipe assembly 24 in order to achieve a desired NOx conversion efficiency. Instead, the empty chamber 66 downstream of the first SCR catalyst device 52 functions to mix the exhaust gas 22. Less exhaust pipe length means that there is less thermal mass to heat, and the second SCR catalyst 64 will therefore heat more quickly. Instead, the The first SCR catalyst device 52 includes a substrate 54 with a metallic catalyst 56 coated on the substrate 54, as best shown in FIG. 5. The substrate 54 may have a honeycomb shape, forming hexagonal flow paths 55 through the device 52. The surface of the substrate 54 along each hexagonal flow path 55 is coated with the metallic catalyst 56. In a non-limiting example embodiment, the metallic catalyst 56 is a stainless steel with a high operating temperature and a long service life. For example, the metallic catalyst may be an iron-chromium-aluminum (FeCrAl) foil, such as DIN 1.4725 stainless steel. Metallic catalysts have high thermal conductivity with a short light off time and low risk of overheating. Metallic catalysts also have relatively thin walls that help to enable a relatively small pressure drop through the exhaust system 24. The thin walls also have a large effective surface area and high mechanical strength.

The first SCR catalyst device 52 also includes an electric heater 60 that is configured to heat the metallic catalyst 56. The electric heater 60 is upstream of the substrate 54 in the flow of exhaust 22. The electric heater 60 and the first SCR catalyst device 52 are housed within the component housing 26E. The electric heater 60 is energized by an electric power source 62, such as a vehicle battery. In one embodiment, the electric heater 60 is a 2000 Watt heater. Energizing of the electric heater 60 may be controlled by an electronic control unit (not shown) that controls switches based on sensed temperature and other engine operating parameters. Because the catalyst 56 is a metallic catalyst, it rapidly heats to increase the efficiency of the first SCR catalyst device 52, even when the exhaust gas temperature is relatively low, such as after an engine cold start. As used herein, an engine cold start is a start of the engine 12 after the engine has been off for a predetermined amount of time, with the vehicle 10 not in use.

A second SCR catalyst device 64 is positioned downstream in the flow of engine exhaust 22 from the first SCR catalyst device 52 and upstream of the engine exhaust system outlet 30. The first SCR catalyst device 52 and the component housing 26E define an empty chamber 66 between the substrate 54 and the second SCR catalyst device 64 such that engine exhaust 22 flows directly from the substrate flow paths 55 to the second SCR catalyst 64 through the empty chamber 66. The empty chamber 66 allows further mixing of the exhaust 22, due to turbulence caused in the empty chamber 66, prior to entry into the second SCR catalyst device 64.

In the embodiment of FIGS. 1-5, the substrate 54 of the first SCR device 52 has an inlet face 70 generally perpendicular to the direction of engine exhaust 22 flow, and an outlet face 72 angled with respect to the direction of engine exhaust 22 flow. The direction of flow of engine exhaust 22 at the first SCR catalyst device 52 is considered to be along a center longitudinal axis of the component housing 26E, and is indicated by each of the arrows representing flow of engine exhaust 22 in FIG. 1. The first SCR catalyst device 52 is bonded by the generally cylindrical housing component 26E in the embodiment of FIG. 2. The substrate 54 has an inlet face 70 generally perpendicular to the direction of engine exhaust flow. The inlet face 70 has a generally circular periphery in accordance with the cylindrical inner wall of the component housing 26E, which the inlet face 70 abuts. The inlet face 70 is generally planar with hexagonal openings for the flow paths 55.

Figure 2:
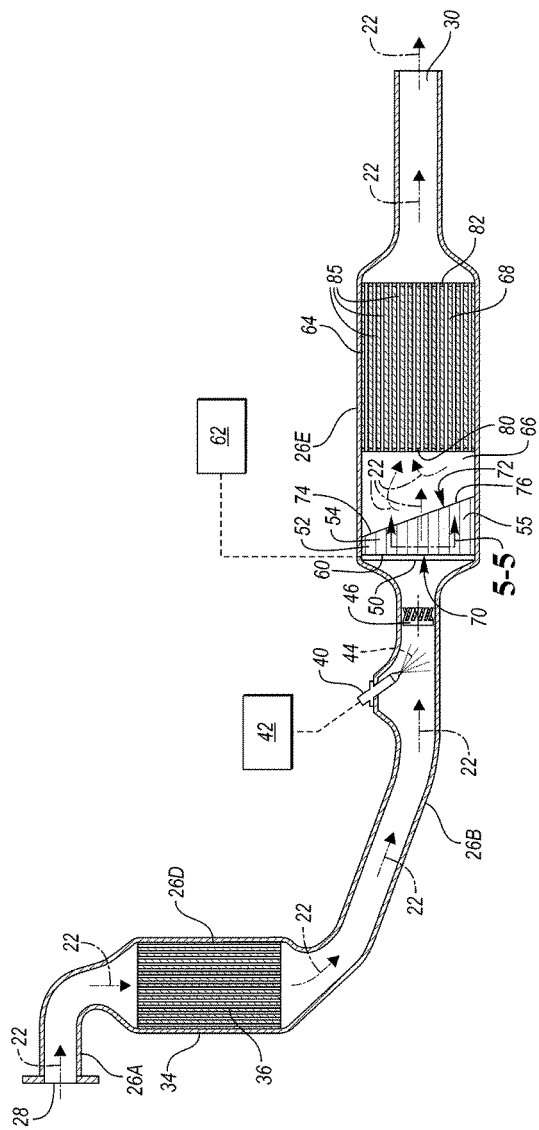
FIG. 2 is a schematic cross-sectional illustration of the engine exhaust system of FIG. 1.
Figure 3:
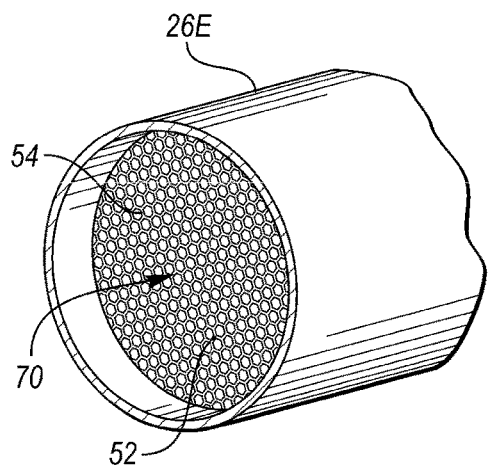
FIG. 3 is a schematic illustration in fragmentary cross-sectional and perspective view of the exhaust system of FIG. 1 showing an inlet face of an electrically-assisted selective catalyst reduction device of the engine exhaust system of FIG. 1.
Figure 4:
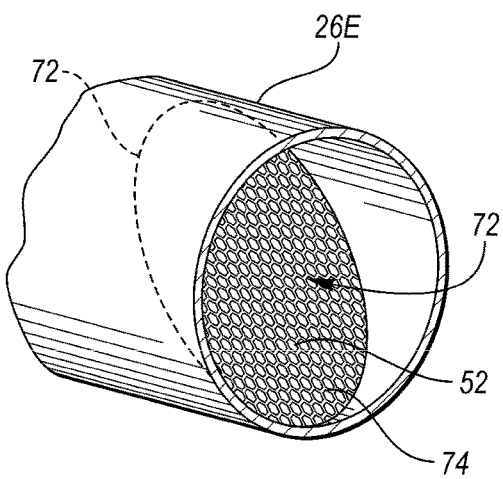
FIG. 4 is a schematic illustration in fragmentary cross-sectional and perspective view of an outlet face of the electrically-assisted selective catalyst reduction device of the engine exhaust system of FIG. 1.

The outlet face 72 is generally planar and perpendicular to the direction of flow of exhaust gas 22, with hexagonal openings of the flow paths 55, as shown in FIG. 4. The outlet face 72 is angled such that it is not perpendicular with respect to the direction flow of engine exhaust 22. More specifically, as best shown in FIG. 2, the outlet face 72 is tilted within the component housing 26E so that a portion 76 of the outlet face 72 is further downstream in the flow of exhaust 22 and a portion 74 is further upstream in the flow of exhaust 22. The periphery of the outlet face 72 is generally oval in accordance with the cylindrical wall of the component housing 26E, which the outlet face 72 abuts. By angling the outlet face 72, turbulent flow is generated, and corresponding mixing of the exhaust flow 22 occurs in the empty chamber 66 as the pressure within the chamber 66 is different in the foreshortened lower half than in the larger upper half of the chamber 66. The exhaust 22 then flows through the second SCR catalyst device 64, which also has a substrate 68. The substrate 68 may have hexagonal openings at the inlet face 80 and the outlet face 82, with generally straight hexagonal flow paths 85 between the faces 80, 82, and with a selective reduction catalyst coated on the substrate 68.

By providing the electrically-assisted first SCR catalyst device 52, exhaust gas 22 at a relatively low temperature, such as after a cold start, can be treated by the first SCR device 52, further mixed in the empty chamber 66, and then treated by the second SCR catalyst device 64, and a desired efficiency of NOx conversion can be achieved with a relatively compact exhaust system 24 (i.e., have a shorted overall length from the inlet 28 to the outlet 30), with a low back pressure and with only one mixer 46. In the embodiment of FIG. 1, the substrate 54 with the metallic catalyst 56 coated thereon occupies a first volume V1, the empty chamber 66 has a second volume V2 greater than the first volume, and the second SCR catalyst device 64 has a third volume V3 greater than the second volume V2. The first volume V1 may be about 1 liter, the second volume V2 may be about 1.7 liters, and the third volume V3 may be about 4 liters. For example, in one embodiment, the engine exhaust system 24 has a DEF evaporation rate of at least 92 percent, a uniformity index of at least 0.81, and a NOX conversion efficiency of at least 79 percent upstream of the second SCR catalyst device 64 when an injection rate of DEF 44 from the DEF injector 40 is about 75 kilograms per hour and temperature of the engine exhaust 22 at the DEF injector 40 is about 160 degrees Fahrenheit. The uniformity index is a measure of the uniformity of the composition of the exhaust gas over a cross-section of the exhaust flow perpendicular to the direction of flow. A uniformity index of 1.0 is perfect uniformity.

By utilizing an electrically-assisted first SCR catalyst device 52 with a metallic catalyst 56 heated by the electric heater 60, DEF injection can begin at a lower temperature of the exhaust gas 22, several seconds earlier than otherwise following a cold start of the engine. Additionally, by providing the empty chamber 66 between the first SCR catalyst device 56 and the second SCR catalyst device 64, only one mixer 46 is needed, and a shortened exhaust system 24 with relatively low back pressure can achieve a high NOx conversion efficiency.

Figure 6:
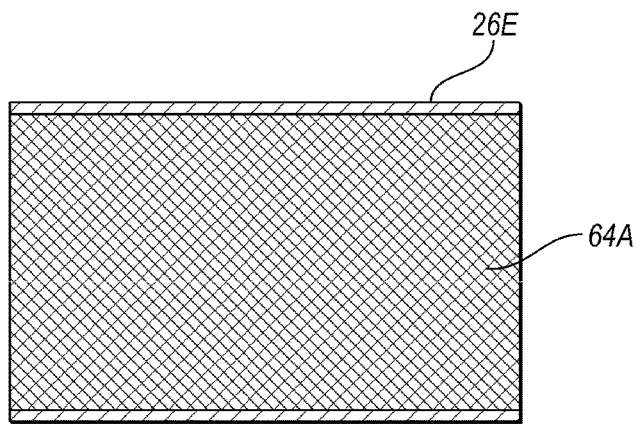
FIG. 6 is a schematic illustration in cross-sectional view of an alternative embodiment of a second selective catalyst reduction device for the engine exhaust system of FIG. 1.

In an alternative embodiment, the second SCR catalyst device 64 can be replaced by a selective catalyst reduction filter (SCRF) catalyst device 64A shown in FIG. 6. The SCRF catalyst device 64A has a substrate that is a filter with a selective reduction catalyst coated on the filter.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An engine exhaust system comprising:
an exhaust pipe assembly having an engine exhaust system inlet configured to receive engine exhaust and an engine exhaust system outlet;
a first selective catalytic reduction (SCR) catalyst device positioned downstream in exhaust flow from the engine exhaust system inlet; wherein the first SCR catalyst device includes:
a substrate with a metallic catalyst coated on the substrate;
an electric heater configured to heat the metallic catalyst;
a second SCR catalyst device positioned downstream in engine exhaust flow from the first SCR catalyst device and upstream of the engine exhaust system outlet;
wherein the first SCR catalyst device and the exhaust pipe assembly define an empty chamber between the substrate and the second SCR catalyst device such that engine exhaust flows directly from the substrate to the second SCR catalyst device through the empty chamber: and
wherein the substrate of the first SCR device has an inlet face generally perpendicular to the direction of engine exhaust flow, and an oval outlet face angled such that it is not perpendicular with respect to the direction of engine exhaust flow.

2. The engine exhaust system of claim 1, wherein the exhaust pipe assembly further comprises an exhaust pipe segment operatively connected to an inlet of first SCR catalyst device upstream in the engine exhaust flow from the first SCR catalyst device and downstream in engine exhaust flow from the engine exhaust system inlet, and the engine exhaust system further comprising:
an exhaust mixer positioned in the exhaust pipe segment.

3. The engine exhaust system of claim 2, wherein the exhaust mixer is the only exhaust mixer in the engine exhaust system between the engine exhaust system inlet and the engine exhaust system outlet.

4. The engine exhaust system of claim 2, further comprising:
a diesel exhaust fluid (DEF) injector disposed in the exhaust pipe segment upstream in the engine exhaust flow from the exhaust mixer.

5. The engine exhaust system of claim 4, further comprising:
a diesel oxidation catalyst (DOC) disposed in the engine exhaust system downstream in the engine exhaust flow from the engine exhaust system inlet and upstream in the engine exhaust flow of the DEF injector.

6. The engine exhaust system of claim 4, wherein the engine exhaust system has a DEF evaporation rate of at least 92 percent, a uniformity index of at least 0.81, and a NOX conversion efficiency of at least 79 percent upstream of the second SCR catalyst device when an injection rate of DEF from the DEF injector is about 75 kilograms per hour and temperature of the engine exhaust at the DEF injector is about 160 degrees Fahrenheit.

7. The engine exhaust system of claim 1, wherein the second SCR catalyst device includes a filter.

8. The engine exhaust system of claim 1, wherein the exhaust pipe assembly is single wall pipe.

9. The engine exhaust system of claim 1, wherein the first SCR catalyst device has a first efficiency and the second SCR catalyst device has a second efficiency greater than the first efficiency.

10. The engine exhaust system of claim 1, wherein the substrate with the metallic catalyst coated thereon has a first volume, the empty chamber has a second volume greater than the first volume, and the second SCR catalyst device has a third volume greater than the second volume.

11. The engine exhaust system of claim 10, wherein the first volume is about 1 liter, the second volume is about 1.7 liters, and the third volume is about 4 liters.

12. An engine exhaust system comprising:
an exhaust pipe assembly having an engine exhaust system inlet configured to receive engine exhaust and an engine exhaust system outlet:
a first selective catalytic reduction (SCR) catalyst device positioned downstream in exhaust flow from the engine exhaust system inlet: wherein the first SCR catalyst device includes:
a substrate with a metallic catalyst coated on the substrate;

an electric heater configured to heat the metallic catalyst;
a second SCR catalyst device positioned downstream in engine exhaust flow from the first SCR catalyst device and upstream of the engine exhaust system outlet;
wherein the first SCR catalyst device and the exhaust pipe assembly define an empty chamber between the substrate and the second SCR catalyst device such that engine exhaust flows directly from the substrate to the second SCR catalyst device through the empty chamber;
the first SCR device has a generally cylindrical housing; and the substrate has a circular inlet face generally perpendicular to the direction of engine exhaust flow, and an oval outlet face angled such that it is not perpendicular with respect to the direction of engine exhaust flow.

13. A vehicle comprising:
a diesel engine having an engine exhaust outlet;
an engine exhaust system including:
an exhaust pipe assembly having an engine exhaust system inlet configured to receive engine exhaust and an engine exhaust system outlet;
a first selective catalytic reduction (SCR) catalyst device positioned downstream in exhaust flow from the engine exhaust system inlet; wherein the first SCR catalyst device includes:
a substrate with a metallic catalyst coated on the substrate;
an electric heater configured to heat the metallic catalyst;
a second SCR catalyst device positioned downstream in engine exhaust flow from the first SCR catalyst device and upstream of the engine exhaust system outlet;
wherein the first SCR catalyst device and the exhaust pipe assembly define an empty chamber between the substrate and the second SCR catalyst device such that engine exhaust flows directly from the substrate to the second SCR catalyst through the empty chamber;
a diesel exhaust fluid (DEF) injector disposed in the exhaust pipe assembly upstream in engine exhaust flow of the first SCR catalyst device; and
wherein the substrate of the first SCR device has an inlet face generally perpendicular to the direction of engine exhaust flow, and an oval outlet face angled such that it is not perpendicular with respect to the direction of engine exhaust flow.

14. The vehicle of claim 13, further comprising:
only a single exhaust mixer disposed within the exhaust pipe assembly; and
wherein the single exhaust mixer is disposed downstream in engine exhaust flow of the DEF injector and upstream in engine exhaust flow of the first SCR catalyst device.

15. The vehicle of claim 13, further comprising:
a diesel oxidation catalyst (DOC) disposed in the engine exhaust system downstream in the engine exhaust flow from the engine exhaust system inlet and upstream in the engine exhaust flow of the DEF injector.

16. The vehicle of claim 13, wherein the exhaust pipe assembly is single wall pipe.

17. The vehicle of claim 13, wherein the substrate with the metallic catalyst coated thereon has a first volume, the empty chamber has a second volume greater than the first volume, and the second SCR catalyst device has a third volume greater than the second volume;
wherein the first volume is about 1 liter, the second volume is about 1.7 liters, and the third volume is about 4 liters.

* * * * *